(12) United States Patent
Chong

(10) Patent No.: US 9,228,337 B2
(45) Date of Patent: Jan. 5, 2016

(54) QUICK CONNECT STRUCTURAL SYSTEM

(75) Inventor: Hin Chung Chong, Richmond (CA)

(73) Assignee: E6-Xtrusion Structures Inc., Richmond, BC (CA)

( * ) Notice: Subject to any disclaimer, the term of this patent is extended or adjusted under 35 U.S.C. 154(b) by 571 days.

(21) Appl. No.: 13/640,459

(22) PCT Filed: Apr. 11, 2011

(86) PCT No.: PCT/CA2011/050190
§ 371 (c)(1),
(2), (4) Date: Oct. 10, 2012

(87) PCT Pub. No.: WO2011/130851
PCT Pub. Date: Oct. 27, 2011

(65) Prior Publication Data
US 2013/0034383 A1    Feb. 7, 2013

Related U.S. Application Data

(60) Provisional application No. 61/327,391, filed on Apr. 23, 2010.

(51) Int. Cl.
| | | |
|---|---|---|
| *E04B 1/19* | (2006.01) | |
| *E04B 1/24* | (2006.01) | |
| *E04C 3/04* | (2006.01) | |
| *E04C 3/28* | (2006.01) | |
| *E05D 5/02* | (2006.01) | |

(Continued)

(52) U.S. Cl.
CPC ... *E04B 1/24* (2013.01); *E04C 3/04* (2013.01); *E04C 3/28* (2013.01); *E05D 5/0238* (2013.01); *F16B 7/0473* (2013.01); *E04B 2/7827* (2013.01); *E04B 2001/249* (2013.01); *E04B 2001/2415* (2013.01); *E04B 2001/2475* (2013.01); *E04B 2001/2481* (2013.01); *E04B 2001/2496* (2013.01); *E04B 2001/5868* (2013.01); *E04B 2001/5875* (2013.01); *E04C 2003/0421* (2013.01); *E04C 2003/0439* (2013.01); *E04C 2003/0465* (2013.01); *Y10T 403/4602* (2015.01)

(58) Field of Classification Search
None
See application file for complete search history.

(56) References Cited

U.S. PATENT DOCUMENTS

| | | |
|---|---|---|
| 3,715,849 A | 2/1973 | Strassle |
| 5,524,397 A | 6/1996 | Byers |

(Continued)

FOREIGN PATENT DOCUMENTS

| | | |
|---|---|---|
| EP | 113494 A1 | 7/1994 |
| WO | 9850639 A2 | 11/1998 |

*Primary Examiner* — Victor MacArthur
(74) *Attorney, Agent, or Firm* — Alphabetica Law

(57) ABSTRACT

A kit for an easy quick connect structural system for constructing framework structures comprising a plurality of elongate rectangular prism frame members is provided. The frame members incorporate custom design features which provide structural strength, facilitate assembly and expansion of the framework structure and allow ease of attachment and securing of accessories. These design features include a corner groove, a central hollow longitudinal chamber, at least one sub-trade chamber, at least one outer main channel, stub-nosed channels, and claw assembles flanking each corner groove. There is provided a plurality of snap-in connectors designed and configured to mate with the frame members such that the frame members can be secured in various arrangements with respect to each other. There is further provided custom reinforcement brackets designed and configured to securely bind together a selection of the plurality of the frame members.

10 Claims, 17 Drawing Sheets

(51) Int. Cl.
*F16B 7/04* (2006.01)
*E04B 2/78* (2006.01)
*E04B 1/58* (2006.01)

(56) References Cited

U.S. PATENT DOCUMENTS

| | | | |
|---|---|---|---|
| 6,397,551 B1 | 6/2002 | Lewcock | |
| 6,478,501 B1 * | 11/2002 | Kahl | 403/255 |
| 6,601,362 B1 * | 8/2003 | Prince | 52/844 |
| 7,014,213 B1 * | 3/2006 | Kaiser | 285/125.1 |
| 7,073,943 B2 * | 7/2006 | Schmalzhofer | 384/35 |
| D697,231 S * | 1/2014 | Ono | D25/61 |
| 2003/0039507 A1 * | 2/2003 | Liu | 403/217 |
| 2010/0074682 A1 * | 3/2010 | Pecar et al. | 403/362 |
| 2013/0034383 A1 * | 2/2013 | Chong | 403/231 |

\* cited by examiner

QUICK CONNECT STRUCTURAL SYSTEM

FIELD OF THE INVENTION

The invention relates generally to a construction system for design of framework structures in the construction and manufacturing industries. In particular, this invention relates to an easy quick connect structural system.

BACKGROUND OF THE INVENTION

Prefabricated structures are buildings or structures that are constructed from standard sections that are manufactured off-site in advance and then shipped and assembled at the desired final location. Structural framing systems are found in the construction industry, agricultural/landscaping industry, home improvements industry and the toy industry.

Mainly due to transportation difficulties, current designs for prefabricated structures are generally limited in size and the final structure is not readily expandable.

While various prior designs for prefabricated structures have some degree of isolated merit, none fully meets all the objectives of providing a structural system that is long lasting, structurally strong, easy to construct, readily expandable and portable.

SUMMARY OF THE INVENTION

An objective of the present invention is to provide a easy quick connect structural system that is long lasting, structurally strong, easy to construct, readily expandable and portable.

In one aspect of the present invention, there is provided a framing system with several easy-to-connect components and accessories. The present invention provides a versatile structural framing system that is useful for framing design projects quickly and efficiently and which is easily expandable.

Advantages of the present invention are that the framework is readily expandable, systematic and relatively quick to install. With an embodiment of the present invention many rectangular building envelope and interior room design enclosures can be readily constructed. Embodiments of the present invention are strong, durable and easy to maintain (repair or replace). Components of the present system are interchangeable and fully snap-in components for framing and enclosing structures. In an embodiment of the present invention, a full turnkey building shell can be readily completed by matching the expandable framing with interconnecting, finishing and compatible exterior/interior sandwich wall panels and interlocking accessories.

The system of the present invention comprises prefabricated components for framing and walls. Component strength; conformity; and installation ease is increased while material waste is reduced.

In accordance with an aspect of the present invention there is provided an elongate rectangular prism frame member, having a first end and a second end longitudinally opposed thereto, the frame member having four external walls and four corners, the frame member further comprising: a corner groove situated at each corner, said corner groove running axially along the frame member and spanning the length of the frame member from the first end to the second end; a central hollow longitudinal chamber, having four surrounding internal walls, said central chamber spanning the length of the frame member from the first end to the second end; at least one hollow longitudinal sub-trade chamber off-center of the central chamber, said sub-trade chamber spanning the length of the frame member from the first end to the second end; at least one outer main channel positioned in the center of any one of the external walls of the frame member, said outer main channel spanning the length of the frame member from the first end to the second end; a pair of stub-nosed channels flanking each at least one outer main channel, said pair of stub-nosed channels spanning the length of the frame member from the first end to the second end; a pair of opposed claw assemblies flanking each corner groove, said pair of opposed claw assemblies spanning the length of the frame member from the first end to the second end; wherein each one of the pair of claw assemblies comprises a finger-grip and an opposed thumb-lock.

In accordance with another aspect of the present invention there is provided a rod-like snap-in perpendicular connector designed and configured to snap-in and secure, in a perpendicular arrangement, a first elongate rectangular prism frame member having a thumb-lock grip and an adjacent corner groove, and a standard wall panel having a first wall and an opposed second wall, said rod-like snap-in perpendicular connector comprising: an insert end designed and configured to mate with the first frame member; and an opposed anchor end designed and configured to snap-in, mate, and brace the standard wall panel through contact with either one of the first wall and the second wall; wherein the insert end comprises a knife-edge probe and an adjacent spaced apart toe-hold and wherein the toe hold is designed and configured to slide-in and mate with the thumb-lock grip of the first frame member and the knife-edge probe is designed and configured for insertion into the corner groove of the first frame member.

In another aspect of the invention there is provided a custom reinforcement bracket designed and configured to securely bind together a plurality of elongate rectangular prism frame members said reinforcement bracket comprising: a planar base plate; a plurality of guide tabs spaced apart for receiving and guiding one of the plurality of frame members, said plurality of guide tabs projecting upwards from the base plate; a plurality of raised dimples spaced apart on the base plate, said raised dimples for receiving and securing the one of the plurality of frame members; at least one flute spanning the base plate, said at least one flute for increased structural strength of the base plate.

In accordance with another aspect of the present invention there is provided a custom reinforcement eight-way bracket designed and configured to securely bind together eight rail members, said eight rail members extending out from a centre point of the custom reinforcement eight-way bracket, said custom reinforcement eight-way bracket comprising: an outer diameter; a lock location diameter less than the outer diameter; a plurality of guide tabs equally spaced apart around the outer diameter, said one of said plurality of guide tabs projecting upwards at a right angle to the plane of the custom reinforcement eight-way bracket; a plurality of raised triangular dimples equally spaced apart around the lock location diameter and each one of the plurality of raised triangular dimples in line with one of the plurality of guide tabs and wherein an apex of each one of the plurality of triangular locking dimples points toward the centre point of the custom reinforcement eight-way bracket; a star patterned flute, having at least eight rays, projects outward from the centre point of the custom reinforcement eight-way bracket; a plurality of through-holes spaced apart around each one of the plurality of raised triangular dimples.

In accordance with another aspect of the present invention there is provided kit for a easy quick connect structural system for constructing framework structures comprising: a plurality of elongate rectangular prism frame members; a plurality of snap-in perpendicular connectors; and a plurality of custom reinforcement brackets designed and configured to securely bind together a selection of the plurality of the frame members.

BRIEF DESCRIPTION OF THE DRAWINGS

The present invention will be further understood from the following description with reference to the accompanying drawings of a representative easy quick connect structural system according to the invention, in which all views are schematic and may not be to scale.

Figure 1:
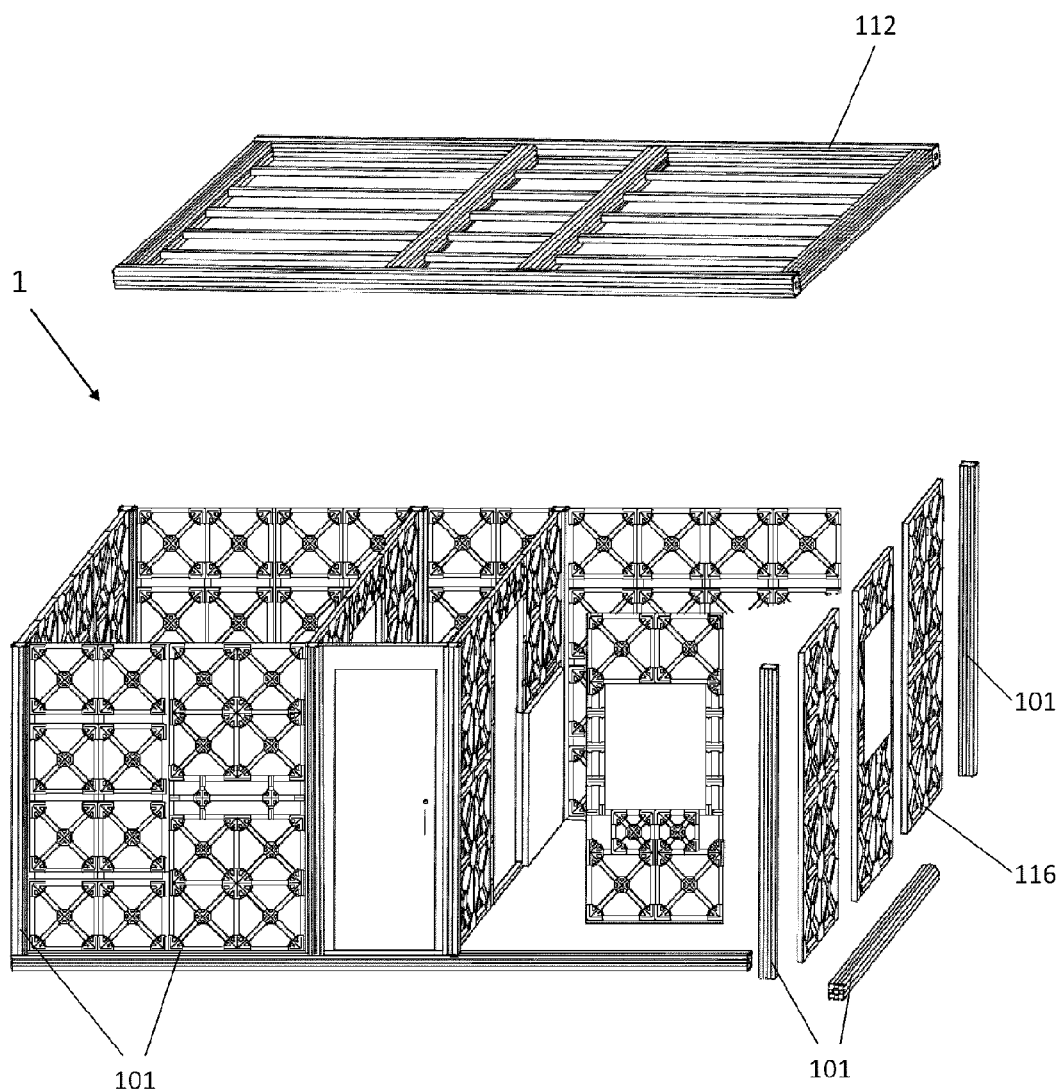
FIG. 1, in an exploded front perspective view, illustrates a easy quick connect structural system of the present invention.

In the drawings, preferred embodiments of the easy quick connect structural system according to the invention are illustrated by way of example. It is to be understood that the description and drawings are only for the purpose of illustration and as an aid to understanding, and are not intended to be a constraint on the limits of the invention.

DETAILED DESCRIPTION

Overview

Referring to FIG. 1, in an exploded front perspective view, there is illustrated an embodiment of the easy quick connect structural system 1 of the present invention. The system 1 comprises a plurality of elongate frame members 101 which, in the final structure, may be arranged either horizontally or vertically with respect to each other. The plurality of frame members 101 are designed and configured to mate in either of an end-to-end linear arrangement or in a perpendicular arrangement with any other one of the plurality of frame members 101 using a variety of snap-in connectors (discussed below). For example, the frame members may be arranged as a rectangular wall unit having top and bottom frame members and a plurality of spaced apart vertical frame members aligned between the top and bottom frame members so as to provide support for a wall. At least one rectangular panel element 116 is supported within the cavity defined by the top and bottom frame members and a neighboring pair of two of the plurality of vertical frame members. The plurality of frame members may be arranged in a planar horizontal rectangular pattern so as to form a floor or roofing support element 112 to support a roof (not shown) or to support further frame members so as to allow expansion of the structure in three-dimensions.

Sample Frame Member

Figure 2A:
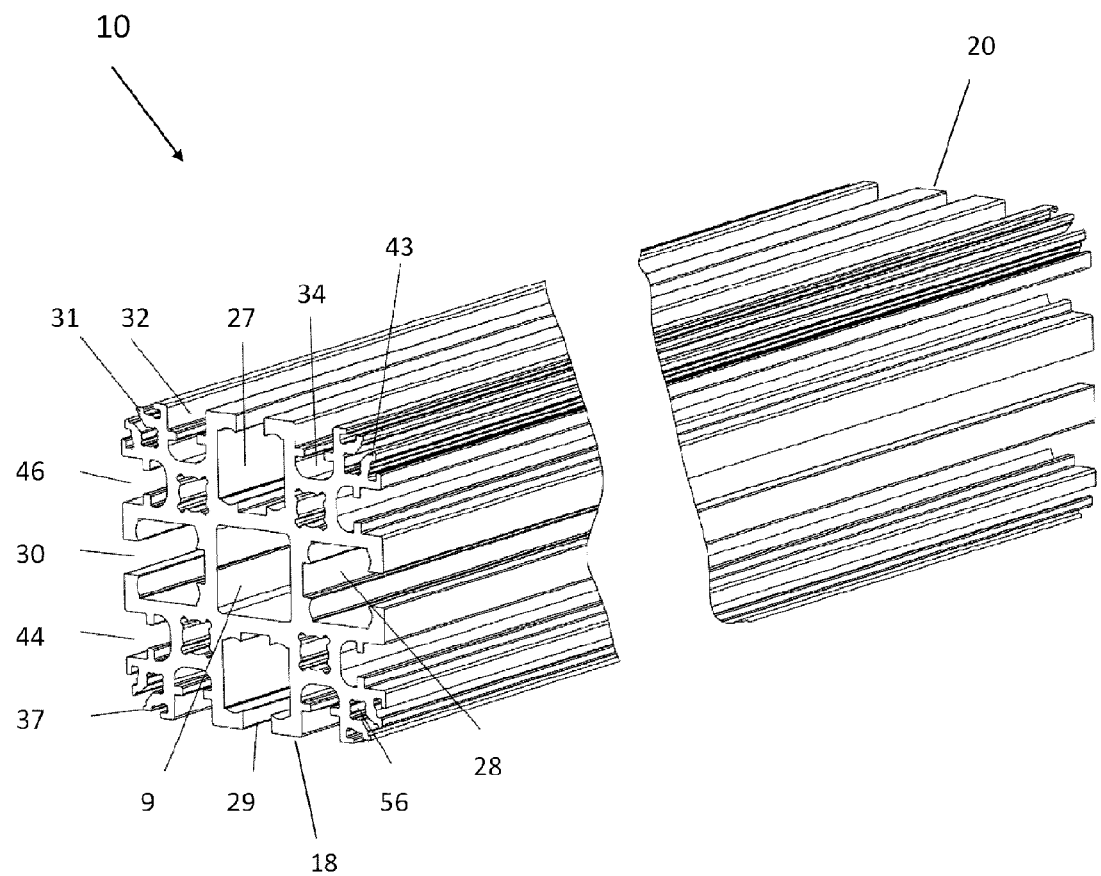
FIG. 2A, in a perspective end and side view, illustrates a sample frame member of the present invention.
Figure 2B:
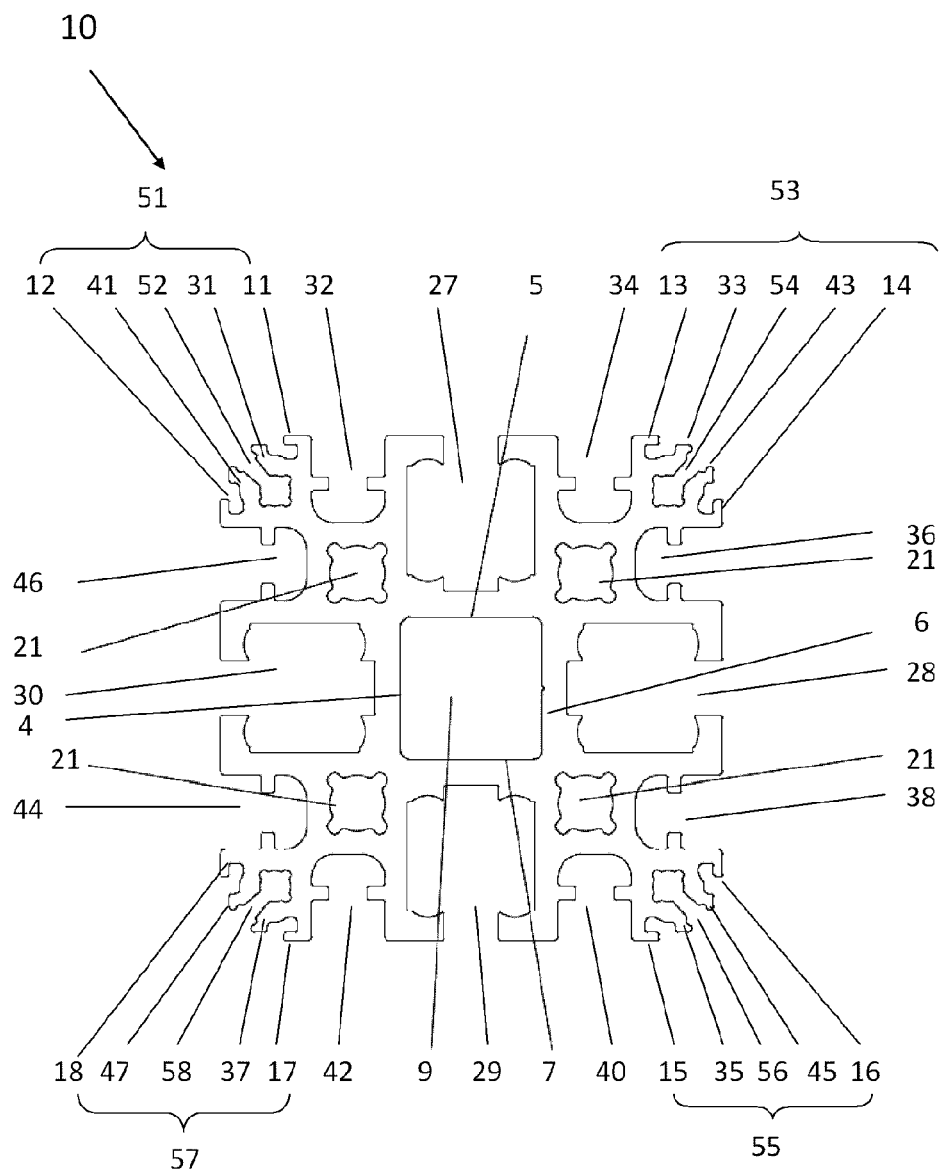
FIG. 2B, in an end elevation view, there is illustrated in the sample frame member of FIG. 2A.

Referring to FIG. 2A, in a perspective end and side view, and FIG. 2B, in an end elevation view, there is illustrated in detail a sample frame member 10 selected, for illustration purposes, from the plurality of frame members 101 of the present invention. The sample frame member 10 is designed and configured as a rectangular prism having a first end 18 and a second end 20 longitudinally opposed thereto. Everywhere along the longitudinal length of the sample frame member 10, the transverse cross-section is nominally a rectangle. The overall outer dimensions of the sample frame member 10 are chosen to closely correspond to the external dimensions of standard steel pipes and tubes that are available in the industry. For example, in one embodiment of the invention the sample frame member 10 has nominal external dimensions of H 3.0 in.×W 1.5 in. The cross-section of the sample frame member 10 may be rectangular as shown in FIGS. 2A and 2B or square (not shown). Typically, the plurality of frame members 101 are manufactured by extrusion using various materials including: steel, aluminum, plastic, and rubber, and are provided in various standard lengths. Each design form for the snap-in frame member can be produced in any size depending on the structural requirements. All snap-in frame members are of universal design thus making any horizontal or vertical frame members interchangeable. The only differentiation among any of the snap-in frame members is the span length which will be determined by the structural capacity requirements of the building design in accordance with a structural engineer's loading design requirements. The various design mold shapes and sizes of the snap-in frame members provide the required structural capacity for many approved building designs by using the minimum amount of materials and therefore saving on material waste.

A number of design features have been included in each of the plurality of frame members 101 to enhance the strength and utility of each of the plurality of frame members 101 compared to the strength and utility of standard hollow rectangular pipes or tubes. For example, as illustrated in FIGS. 2A and 2B, for the sample frame member 10, the sample frame member 10 is provided with a central hollow longitudinal chamber 9 spanning the length of the sample frame member 10, said central chamber 9 defined by 4 surrounding internal walls (4, 5, 6, 7) each of which spans the length of the sample frame member 10. The 4 surrounding internal walls (4, 5, 6, 7) provide support and stability to the sample frame member 10 along the full length thereof. Depending upon the load requirements of the final structure, the central chamber 9 is filled with concrete or other similar material in order to provide further structural strength. Further, if required, an internal longitudinal brace (not shown) is slid into the central chamber 9 from either end of the sample frame member 10 to add further support to the assembled structure.

At least one hollow longitudinal sub-trade chamber 21 is provided off-center of the central chamber 9. The at least one sub-trade chamber 21 spans the full axial length of the sample frame member 10 and lends support thereto through its defining walls. Any one of the at least one sub-trade chamber 21 may be filled with concrete or a brace to add further structural support to the sample frame member 10. Any one of the at least one sub-trade chamber 21 provides available space for accommodating sub-trade installations.

At the midpoint along each external wall of the sample frame member 10 there is provided an outer main channel (27, 28, 29, and 30). Each outer main channel (27, 28, 29, and 30), runs axially along the longitudinal axis of the sample frame member 10 and spans the entire length of the sample frame member 10 from the first end 18 to the second end 20. Each outer main channel (27, 28, 29, and 30) is designed and configured to slidably accept a wheel assembly available in the industry. Further, each outer main channel (27, 28, 29, and 30) is dimensioned and configured to slidably accept a number of improved connection components (discussed below).

Each outer main channel (27, 28, 29, and 30) is flanked on either side by stub-nosed channels (32, 34, 36, 38, 40, 42, 44 and 46). Each of the stub-nosed channels (32, 34, 36, 38, 40, 42, 44 and 46) runs axially along the longitudinal axis of the sample frame member 10 and spans the full length thereof.

Where two neighbouring stub-nosed channels meet orthogonally, there is provided a pair of opposed claw assemblies (51, 53, 55, and 57) separated by a corner groove (52, 54, 56, and 58). For illustration purposes, said corner groove (52, 54, 56, and 58) is situated at the top left, top right, bottom right, and bottom left corner, respectively, of the sample frame member 10 when the frame member 10 is viewed in transverse cross-section in an end elevation view. Each corner groove (52, 54, 56, and 58) runs axially along the full longitudinal length of the sample frame member 10.

Each one of the pair of claw assemblies (51, 53, 55, and 57) comprises a finger-grip (31, 41, 33, 43, 35, 45, 37, and 47) and an opposed thumb-lock grip (11, 12, 13, 14, 15, 16, 17, and 18). Each thumb-lock grip (11, 12, 13, 14, 15, 16, 17, and 18) and each finger-grip (31, 41, 33, 43, 35, 45, 37, and 47) runs axially along the longitudinal axis of the sample frame member 10 and spans the entire length of the sample frame member 10 from the first end 18 to the second end 20. The intersection of the thumb-lock grip (11, 12, 13, 14, 15, 16, 17, and 18) and the neighboring finger-grip (31, 41, 33, 43, 35, 45, 37, and 47) provides available space for insertion of connection components as described below.

It is expressly understood that the arrangement and naming of the elements of the frame member 10 as depicted in the figures is for illustration only and should not be construed to limit the geometrical arrangement of the various elements of the invention. Various geometrical and spatial arrangements of the elements and the means of connecting the elements are possible.

Snap-in and Slide-in Connection Components

The present invention provides various snap-in and slide-in connection components that facilitate the connection of snap-in frame members together or to other components such as wall panels (for example) using a friction locking design without the need for extra fastening elements such as screws or nails.

Coupling of a Wall Panel to a Frame Member

Figure 3A:
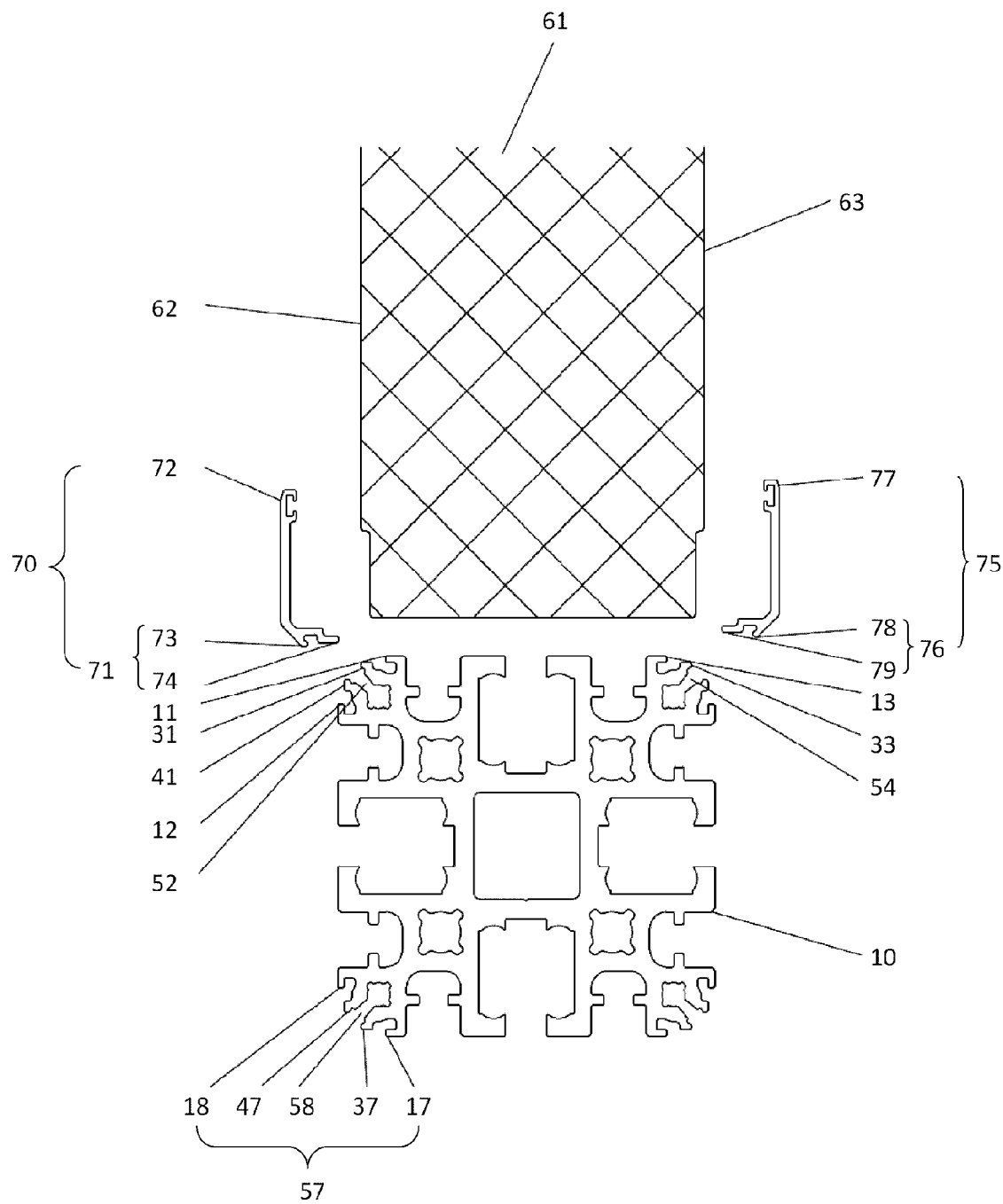
FIG. 3A, in a partially exploded end elevation view, there is illustrated the sample frame member of FIGS. 2A and 2B coupled to a first standard wall panel.
Figure 3B:
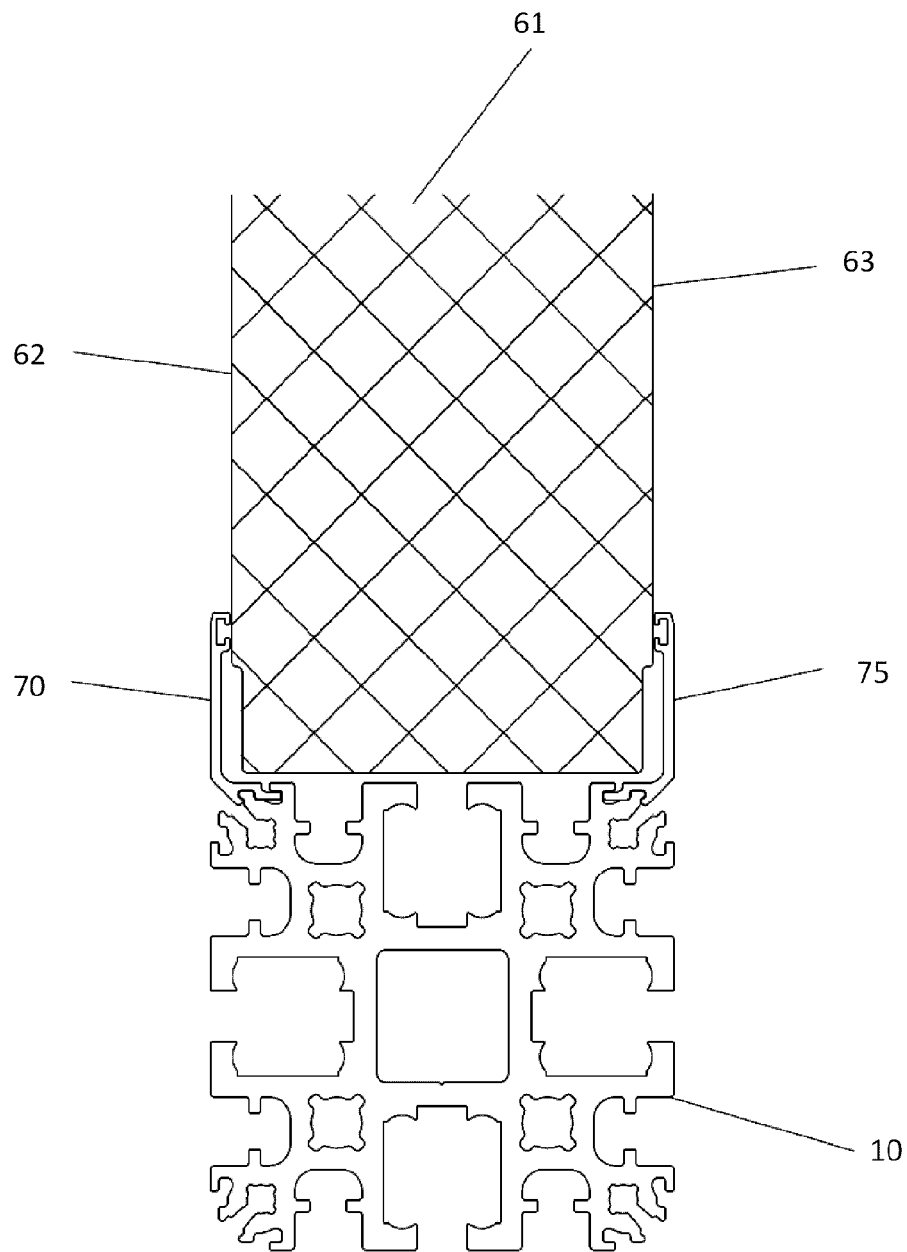
FIG. 3B, in an end elevation view, illustrates the assembly of FIG. 3A.

Referring to FIG. 3A, there is illustrated, in a partially exploded end elevation view, and FIG. 3B, in an end elevation view, the sample frame member 10 (of FIGS. 2A and 2B) coupled to a first standard wall panel 61 having a first inside wall 62 and an outside wall 68 by use of a first rod-like snap-in perpendicular connector 70 such that the sample frame member 10 is secured perpendicularly to the first wall panel 61. The sample frame member 10 is selected, for illustrations purposes, from the plurality of frame members 101 and has all of the attributes thereof. The first snap-in perpendicular connector 70 is designed and configured to provide a secure snap-in link for the mating of any one of the plurality of frame members 101 to the first wall panel 61. The first snap-in perpendicular connector 70 has a first insert end 71 and an opposed first anchor end 72. The first insert end 71 comprises two components, namely, a first knife-edge probe 73 and an adjacent spaced-apart first toe hold 74. In practice, the first toe hold 74 is inserted at an oblique angle under the thumb-lock grip 11 of the sample frame member 10 and then the first anchor end 72 is eased towards the first inside wall 62 of the first wall panel 61 such that the first anchor end 72 communicates with and stabilizes the first wall panel 61. Simultaneously with the easing of the first anchor end 72 towards the first inside wall 62, the first knife edge probe 73 is slidingly inserted into the corner groove 52 of the sample frame member 10 thereby locking the first perpendicular connector 70 to the sample frame member 10 and stabilizing the first wall panel 61 to the sample frame member 10.

For increased stability of the assembly, a second rod-like snap-in perpendicular connector 75 having a second insert end 76 and an opposed second anchor end 77 is used. The second perpendicular connector 75 is identical in construction to the first perpendicular connector 70. The second insert end 76 comprises two components, namely, a second knife-edge probe 78 and an adjacent spaced-apart second toe hold 79. In practice, the second toe hold 79 is inserted at an oblique angle under the thumb-lock grip 13 of the sample frame member 10 and then the second anchor end 77 is eased towards the outside wall 63 of the wall panel 61 such that the second anchor end 77 communicates with and stabilizes the first wall panel 61. Simultaneously with the easing of the second anchor end 77 towards the first outside wall 63, the second knife edge probe 78 is slidingly inserted into the corner groove 54 of the sample frame member 10 thereby locking the second perpendicular connector 75 to the sample frame member 10 and stabilizing the first wall panel 61 to the sample frame member 10.

Corner Coupling

With one wall panel stabilized against a frame member as in FIGS. 3A and 3B it is possible to secure a second standard wall panel 64, having a second inside wall 65 and a second outside wall 66, to the sample frame member 10 such that the first wall panel 61 and the second wall panel 64 are arranged perpendicularly to each other with the sample frame member 10 anchored at the apex.

Figure 3C:
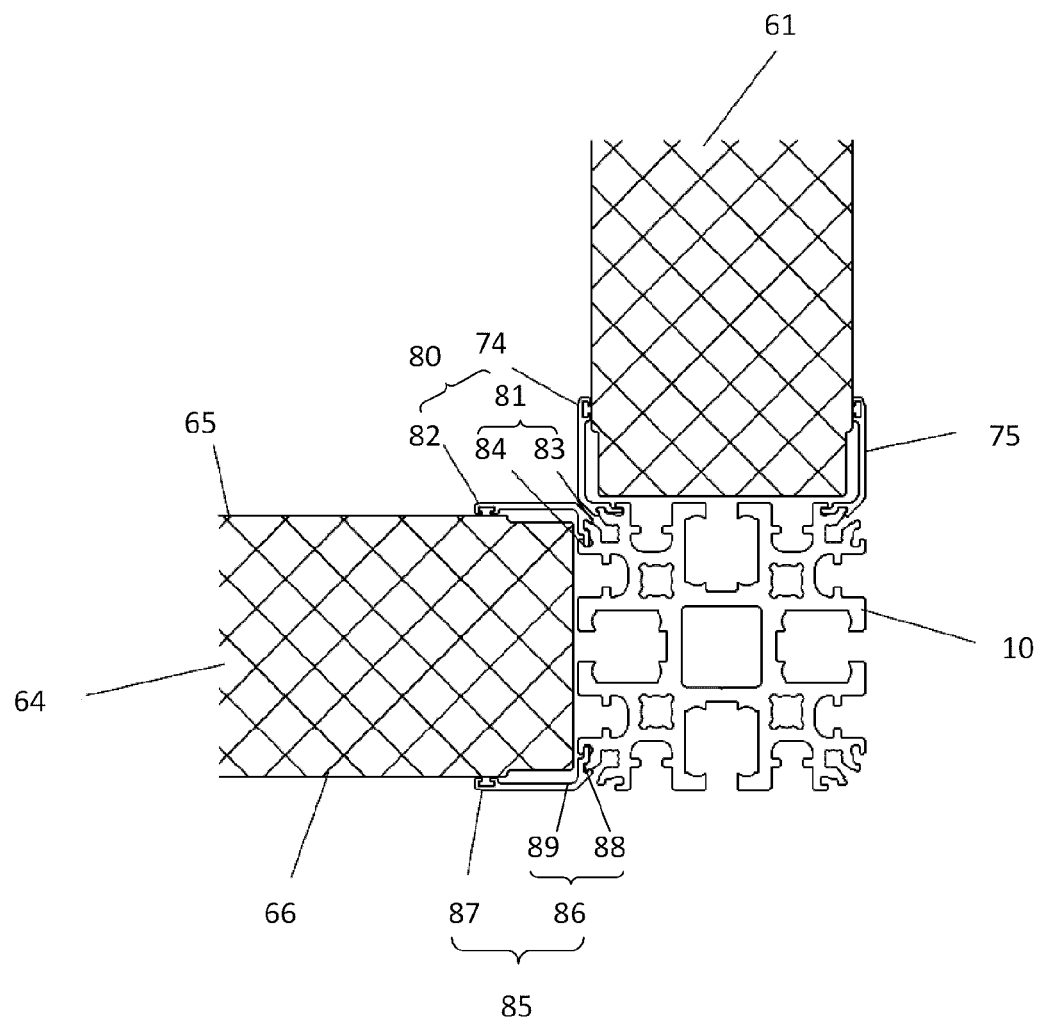
FIG. 3C, in a top elevation view, there is illustrated, the assembly of FIGS. 3A and 3B coupled to a second standard wall panel.

Referring to FIG. 3C, there is illustrated, in a top elevation view, the sample frame member 10 (of FIGS. 2A and 2B) coupled to the first standard wall panel 61 (as illustrated in FIGS. 3A and 3B) using the first rod-like snap-in perpendicular connector 70 and the second perpendicular connector 75 and using a third rod-like snap-in perpendicular connector 80 and a fourth rod-like snap-in perpendicular connector 85.

The third perpendicular connector 80 has a third insert end 81 and an opposed third anchor end 82. The third insert end 81 comprises two components, namely, a third knife-edge probe 83 and an adjacent spaced-apart third toe hold 84. In practice, the third toe hold 84 is inserted at an oblique angle under the thumb-lock grip 12 of the sample frame member 10 and then the third anchor end 82 is eased towards the second inside wall 65 of the second wall panel 64 such that the third anchor end 82 communicates with and stabilizes the second wall panel 64. Simultaneously with the easing of the third anchor end 82 towards the second inside wall 65, the third knife edge probe 83 is slidingly inserted into the corner groove 52 of the sample frame member 10 and alongside the first knife edge probe 73 of the first perpendicular connector 70 thereby locking the third perpendicular connector 80 to the sample frame member 10 and stabilizing the second wall panel 64 to the sample frame member 10.

For increased stability of the assembly, a fourth rod-like snap-in perpendicular connector 85 having a fourth insert end 86 and an opposed fourth anchor end 87 is used. The fourth insert end 86 comprises two components, namely, a fourth knife-edge probe 88 and an adjacent spaced-apart forth toe hold 89. In practice, the fourth toe hold 89 is inserted at an oblique angle under the thumb-lock grip 18 of the sample frame member 10 and then the fourth anchor end 87 is eased towards the second outside wall 66 of the second wall panel 64 such that the fourth anchor end 87 communicates with and stabilizes the second wall panel 64. Simultaneously with the easing of the fourth anchor end 87 towards the second inside wall 65, the fourth knife edge probe 88 is slidingly inserted into the corner groove 58 of the sample frame member 10 thereby locking the fourth perpendicular connector 85 to the sample frame member 10 and stabilizing the second wall panel 64 to the sample frame member 10. The plurality of frame members 101 may be connected together in other arrangements by using further snap-in and slide-in connection components.

Custom Reinforcement Brackets

When required by the structural capacity requirements of the final design, the connections of the frame members to each other may be reinforced using standard angle brackets and corner brackets that are available in the industry. Preferably, custom reinforcement brackets of the present invention as described below are provided. In the description below, all of the custom reinforcement brackets are described as being substantially planar meaning that the base plate mold is planar except for the alignment guides that project upwards at a right angle to the base plate; the raised locking dimples, and the flutes which also project upwards from the base plate. The custom reinforcement brackets are typically fabricated by injection molding from materials such as steel, aluminum, plastic, and rubber. In a preferred embodiment of the invention, the custom reinforcement brackets described below have a nominal thickness of $1/16$". The custom reinforcement brackets described below are designed and configured to securely bind together a selection of standard hollow rectangular pipes or tubes or wood framing rails as available in the industry.

Custom Reinforcement Corner Bracket

Figure 4A:
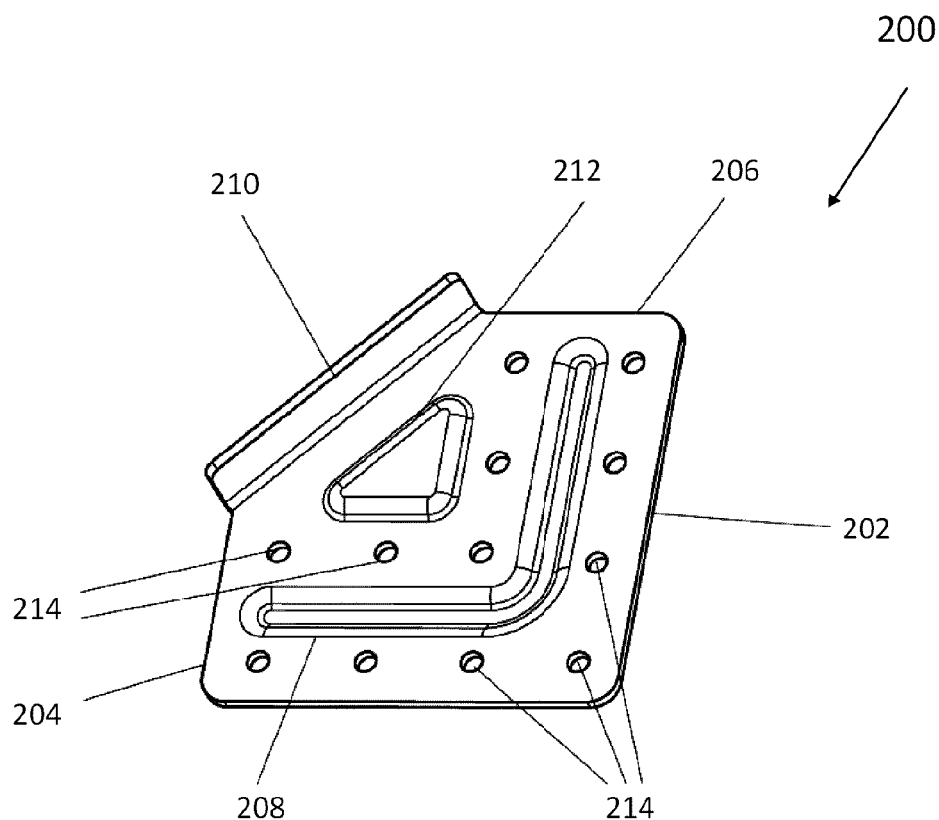
FIG. 4A, in a perspective top view, there is illustrated there is illustrated a custom reinforcement corner bracket of an embodiment of the present invention.
Figure 4B:
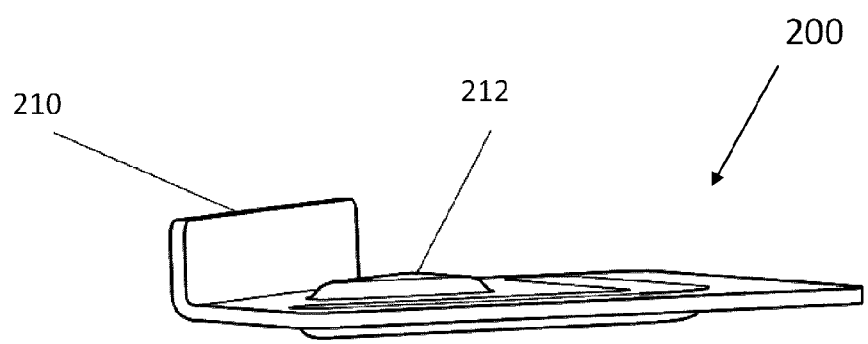
FIG. 4B, in a perspective side view, there is illustrated the custom reinforcement corner bracket of FIG. 4A.

Referring to FIG. 4A, in a perspective top view, and to FIG. 4B, in a perspective side view, there is illustrated a custom reinforcement corner bracket 200 designed and configured to securely bind together, at a right angle to each other, two rail members of an embodiment of the present invention.

The custom reinforcement corner bracket 200 is constructed from a substantially planar base plate 202 having a horizontal arm 204 and a vertical arm 206, the horizontal arm 204 and the vertical arm 206 meeting at a right angle.

For increased strength, the base plate 202 is provided with at least one flute 208 running along the horizontal arm 204 and extending along the vertical arm 206. An alignment lip 210 projects upward at a right angle to the base plate 202. The alignment lip 210 lies perpendicular to the internal angle bisector of the horizontal arm 204 and the vertical arm 206. The base plate 202 is provided with a triangular dimple 212 between the alignment lip 210 and the at least one flute 208 which triangular dimple 212 extends upwards from the plane of the base plate 202. The triangular dimple 212 is located along the internal angle bisector of the horizontal arm 204 and the vertical arm 206 and is oriented such that one apex of the triangular dimple 212 points towards the intersection point of the horizontal arm 204 and the vertical arm 206. A plurality of through-holes 214 positioned along the horizontal arm 204 and the vertical arm 206 are provided for receiving a bolt (not shown) for securing the custom reinforcement corner bracket 200 to a rail member (not shown). Preferably, the rail member is selected from the plurality of frame members 101 of the present invention.

Custom Reinforcement T-Bracket

Figure 5A:
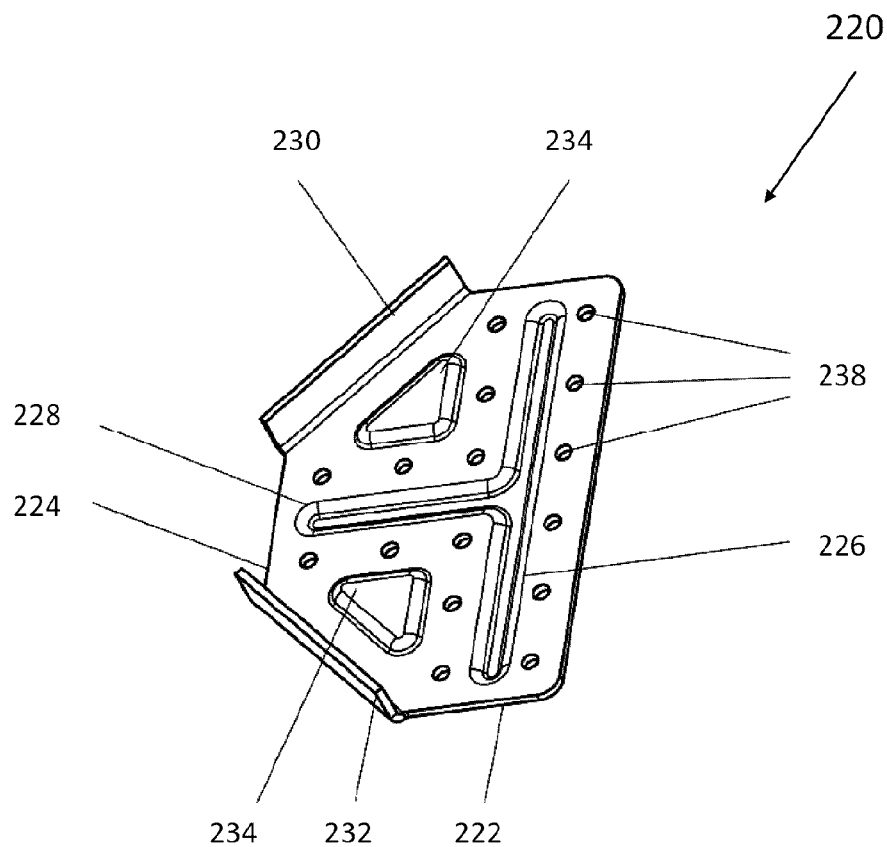
FIG. 5A, in a perspective top view, there is illustrated, a custom reinforcement t-bracket of an embodiment of the present invention.
Figure 5B:
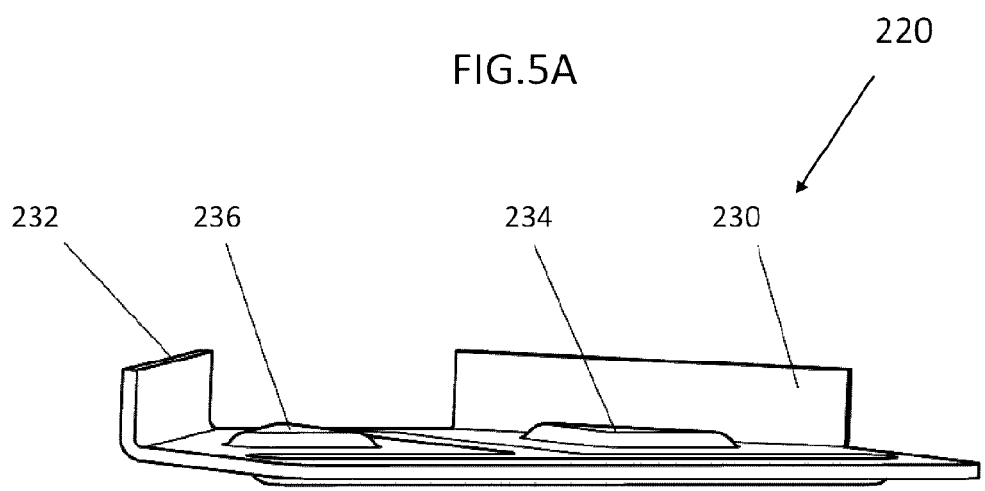
FIG. 5B, in a perspective side view, there is illustrated the custom reinforcement t-bracket of FIG. 5A.

Referring to FIG. 5A, in a perspective top view, and to FIG. 5B, in a perspective side view, there is illustrated, a custom reinforcement t-bracket 220 of an embodiment of the present invention. The custom reinforcement t-bracket 220 is designed and configured to securely bind together, in a t-shape orientation, two rail members (not shown) of the present invention. The custom reinforcement t-bracket 220 is designed to accept any rail members that are standard hollow rectangular pipes or tubes as available in the industry. Preferably, the rail members are of the design and configuration of one of the plurality of frame members 101 of the present invention. Typically, the custom reinforcement t-bracket 220 is fabricated by injection molding and is substantially planar.

The custom reinforcement t-bracket 220 has a first t-arm 222 and a second t-arm 224, the first t-arm 222 and the second t-arm 224 meeting at a right angle, and the second t-arm 224 extends outward from the midpoint of the first t-arm 222. For increased strength, the t-bracket 220 is provided with at least one vertical flute 226 running along the first t-arm 222 and with at least one horizontal flute 228 extending along the second t-arm 224. A top guide lip 230 and a bottom guide lip 232 projects upward at a right angle to the plane of the t-bracket 220. The top guide lip 230 and the bottom guide lip 232 spaced radially away from the intersection of the first t-arm 222 and the second t-arm 224. The top guide lip 222 is oriented at 45 degrees with respect to the second t-arm 224 and the bottom guide lip 232 is oriented at −45 degrees with respect to the second t-arm 224. The t-bracket 220 is provided with a top triangular dimple 234 and a bottom triangle dimple 236 which extend upwards from the plane of the t-bracket 220. The top triangular dimple 234 is placed between the at least one horizontal flute 228 and the top guide lip 230. The bottom triangular dimple 236 is placed between the at least one horizontal flute 228 and the bottom guide lip 232.

Both the top triangular dimple 234 and the bottom triangle dimple 236 are oriented such that one apex of each respective triangular dimple is pointed towards the intersection point of the first t-arm 222 and the second t-arm 224. A plurality of bolt through-holes 238 are positioned along the first t-arm 222 and the second t-arm 224 and are provided for receiving a bolt (not shown) for securing the custom reinforcement t-bracket 220 to the chosen rail members.

Custom Reinforcement Three-Way Bracket

Figure 6A:
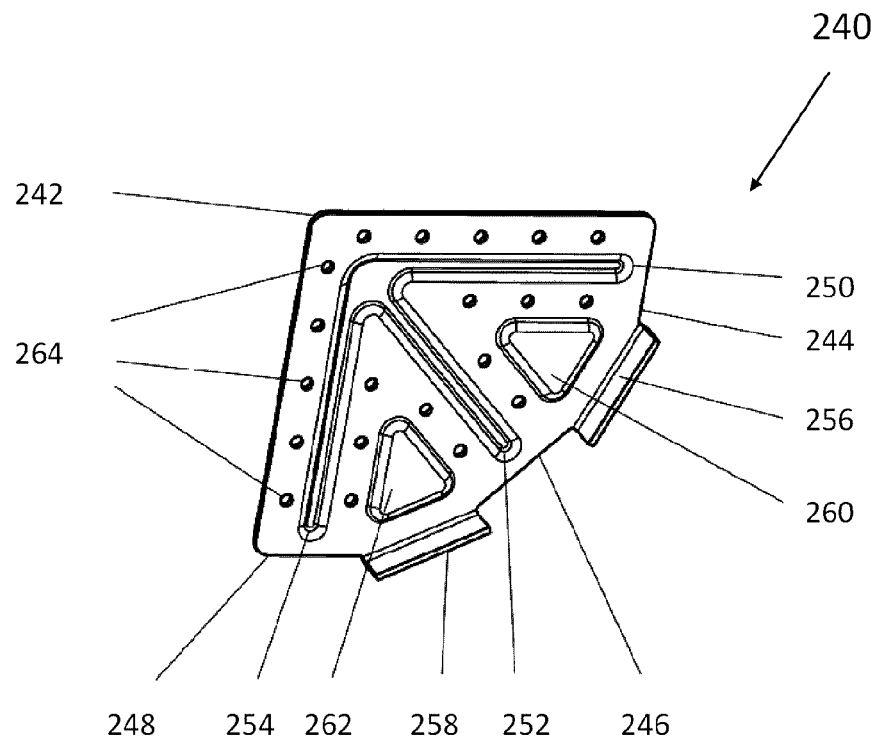
FIG. 6A, in a perspective top view, there is illustrated, a custom reinforcement three-way bracket of an embodiment of the present invention.
Figure 6B:
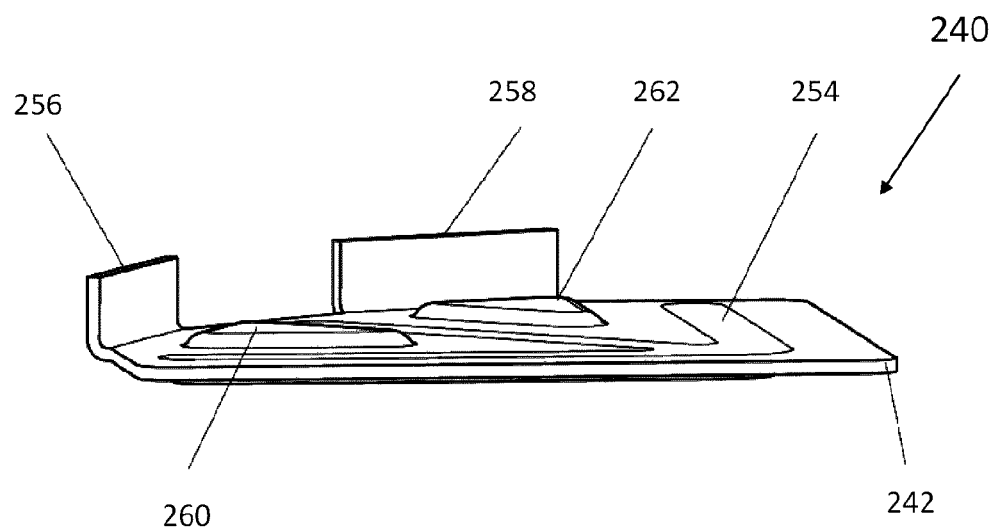
FIG. 6B, in a perspective side view, there is illustrated the custom reinforcement three-way bracket of FIG. 6A.

Referring to FIG. 6A, in a perspective top view, and to FIG. 6B, in a perspective side view, there is illustrated, a custom reinforcement three-way bracket 240 of an embodiment of the present invention. The custom reinforcement three-way bracket is designed and configured to securely bind together three rail members (not shown), said three rail members extending out from a common bracket corner point 242. Preferably, the rail members are of the design and configuration of one of the plurality of frame members 101 of the present invention. Typically, the custom reinforcement three-way bracket 240 is fabricated by injection molding and is substantially planar. In one embodiment of the invention, the three-way bracket 240 has a nominal thickness of $1/16"$.

The custom reinforcement three-way bracket 240 has a first horizontal arm 244, a central arm 246, and a first vertical arm 248 extending outward from the common bracket corner point 242, wherein said first horizontal arm 244 extends outwards horizontally from the common bracket corner point 242 and the first vertical arm extends outwards vertically from the common bracket corner point 242 The central arm extends outwards from the common bracket corner point 242 and along the internal angle bisector of the first horizontal arm 244 and the first vertical arm 248.

For increased strength, the three-way bracket 240 is provided with at least one flute 250, 252, 254 running along each of the first horizontal arm 244, the central arm 246, and the first vertical arm 248.

A first guide lip 256 and a second guide lip 258 projects upward at a right angle to the plane of the three-way bracket 240. The first guide lip 256 and the second guide lip 258 spaced radially away from the bracket corner point 242. The first guide lip 256 is oriented perpendicularly to the internal angle bisector of the first horizontal arm 244 of the three-way bracket 240 and the central arm 246 of the three-way bracket 240. The second guide lip 258 is oriented perpendicularly to the internal angle bisector of the first vertical arm 248 of the three-way bracket 240 and the central arm 246 of the three-way bracket 240.

The three-way bracket 240 is provided with a first triangular dimple 260 and a second triangular dimple 262 which extend upwards from the plane of the three-way bracket 240. The first triangular dimple 260 is placed between the at least one flute 250 extending along the first horizontal arm 244 and the at least one flute 252 extending along the central arm 246. The second triangular dimple 262 is placed between the at least one flute 250 extending along the first vertical arm 248 and the at least one flute 252 extending along the central arm 246.

Both the first triangular dimple 260 and the second triangular dimple 262 are oriented such that one apex of each respective triangular dimple is pointed towards the bracket corner point 242 of the three-way bracket 240. A plurality of bracket through-holes 264 are positioned spaced-apart along the first horizontal arm 244, the central arm 246 and the first vertical arm 248 said plurality of bracket through-holes dimensioned and configured for receiving a bolt (not shown) for securing the custom reinforcement three-way bracket 240 to the chosen rail members.

The custom reinforcement three-way corner bracket 240 may be view as one quadrant of a custom reinforcement eight-way bracket 270 illustrated, in a perspective top view, in FIG. 7A and in a perspective side view, in FIG. 7B, and described in detail below.

Custom Reinforcement Eight-Way Bracket

Figure 7A:
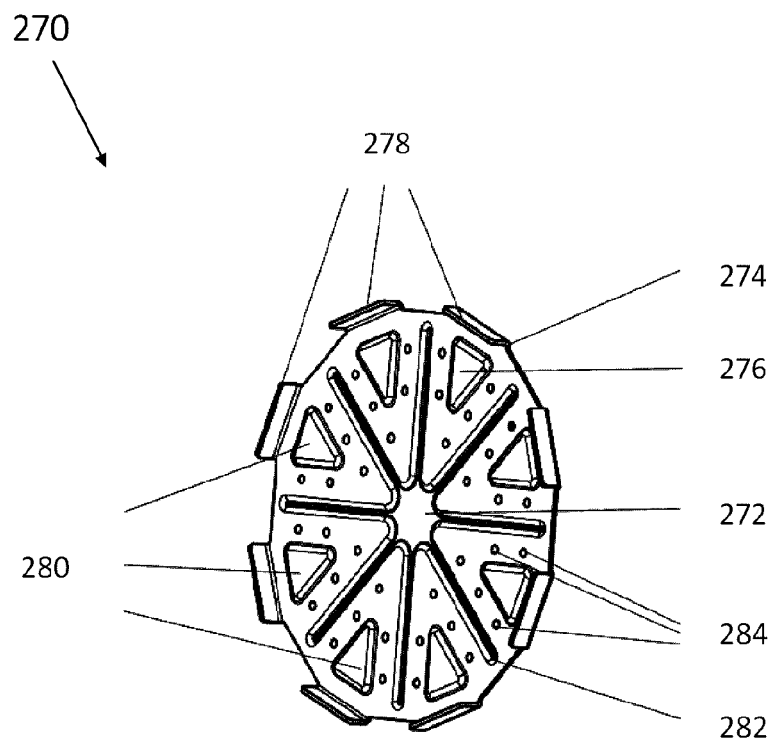
FIG. 7A, in a perspective top view, there is illustrated, a custom reinforcement eight-way bracket 270 of an embodiment of the present invention.
Figure 7B:
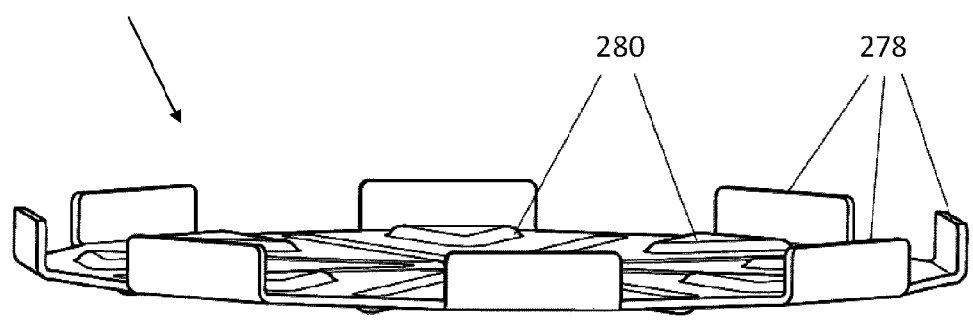
FIG. 7B, in a perspective side view, there is illustrated the custom reinforcement eight-way bracket of FIG. 7A.

Referring to FIG. 7A, in a perspective top view, and to FIG. 7B, in a perspective side view, there is illustrated, the custom reinforcement eight-way bracket 270 of an embodiment of the present invention. The custom reinforcement eight-way bracket 270 is substantially a planar disc having a centre point 272, an outer diameter 274, and a lock location diameter 276 said lock location diameter 276 being less than the outer diameter 274. A plurality of guide tabs 278 are equally spaced apart around the outer diameter 274 of the eight-way bracket 270. Each one of the plurality of guide tabs 278 projects upward at a right angle to the main plane of the eight-way bracket 270. A plurality of raised triangular locking dimples 280 are equally spaced apart at the lock location diameter 276 such that each one of the plurality of locking dimples 280 is aligned with one of the plurality of guide tabs 278, and whereby an apex of each one of the plurality of triangular locking dimples 280 points toward the centre point 272 of the eight-way bracket 270. For increased structural strength, a star patterned flute 282, having at least eight rays, projects outward from the centre point 272 of the eight-way bracket 270. A plurality of screw through holes 284 are provided spaced apart around each of the triangular locking dimples 280.

The custom reinforcement eight-way bracket is designed and configured to securely bind together a plurality of rails (not shown) said plurality of rails extending outwards from the centre point 272 of the eight-way bracket 270. Preferably, the rails are of the design and configuration of one of the plurality of frame members 101 of the present invention.

In a preferred embodiment of the invention the custom reinforcement eight-way bracket 270 is fabricated by injection molding to a thickness of $1/16"$ and is substantially planar; the outer diameter 274 is 8"; the lock location diameter 276 is 6"; the plurality of guide tabs and the plurality of triangular locking dimples 280 each comprise a set of 8; each one of the plurality of locking dimples 280 is fabricated as an equilateral triangle having 1" edge lengths; and each one of the plurality of guide tabs has a length of $1\frac{1}{2}"$.

Figure 7C:
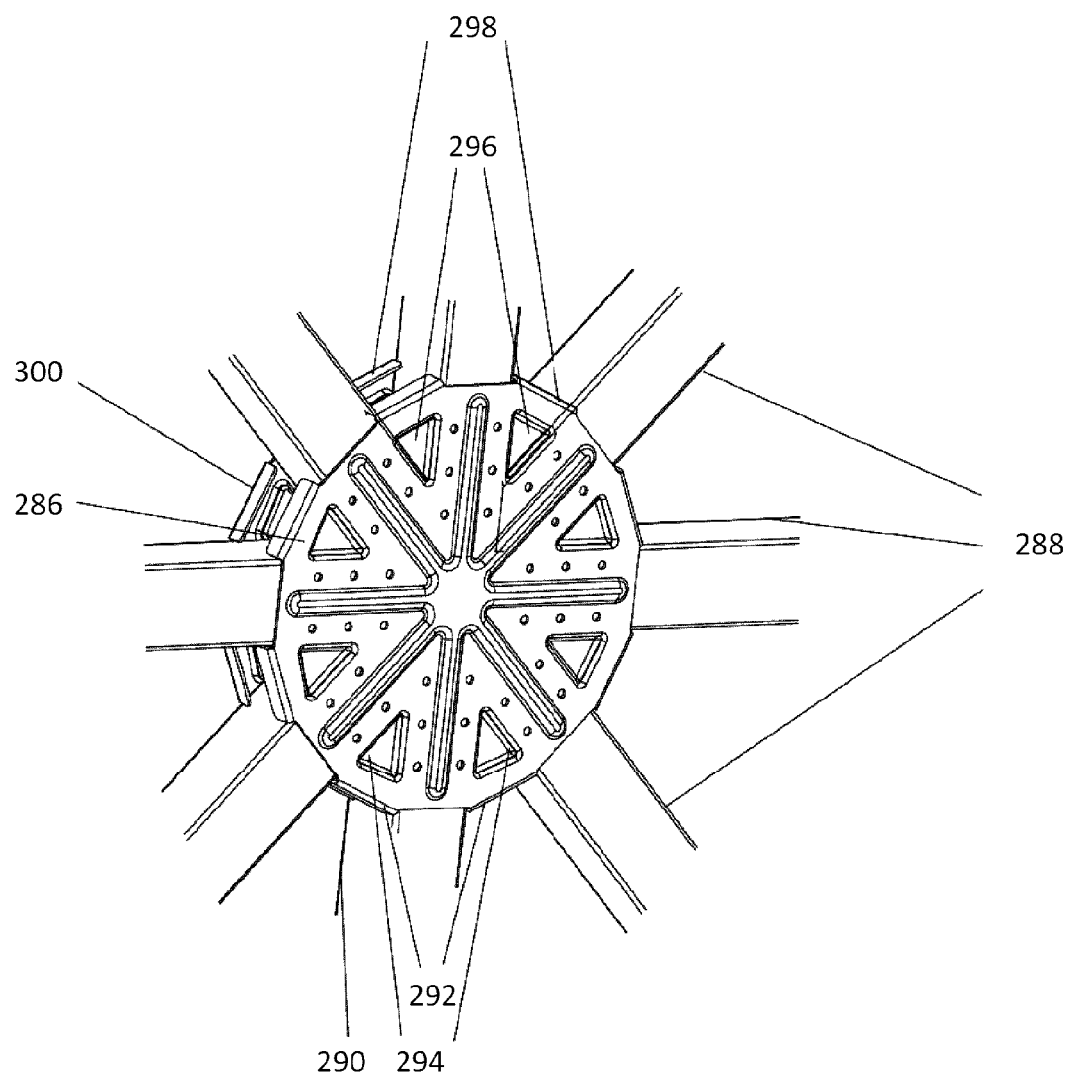
FIG. 7C, in a perspective top and side view, there is illustrated, a front custom reinforcement eight-way bracket of an embodiment of the present invention in use to secure a plurality of rails.

Referring to FIG. 7C, in a perspective top and side view, there is illustrated, a front custom reinforcement eight-way bracket 286 of an embodiment of the present invention in use to secure a plurality of rails 288.

The plurality of rails 288 may be any standard hollow rectangular pipes or tubes as available in the industry. Preferably, the plurality of rails 288 are selected from the plurality of frame members 101 of the present invention. The front eight-way bracket 286 is identical in construction and functionality and has all of the attributes of the custom reinforcement eight-way bracket 270 described above including having guide tabs, triangular locking dimples, and screw through holes.

In practice, a first rail 290 of the plurality of rails 288, is slidingly inserted along the plane of the front eight-way bracket 286 and between a pair of neighbouring guide tabs 292 and between a corresponding pair of neighbouring triangular locking dimples 294 such that the first rail 290 projects along the plane of the front eight-way bracket 286 and through an opposing pair of neighbouring triangular locking dimples 296 and through an opposing pair of neighbouring guide tabs 298.

The pair of neighbouring guide tabs 292 assists the user to properly position the first rail 290 of the plurality of rails 288 whereas the corresponding pair of neighbouring triangular locking dimples 294 locks the first rail 290 in place by preventing off-axis movement of the first rail 290.

Other rails of the plurality of rails 288 may then be inserted along the plane of the front eight-way bracket 288 until they abut the first rail 290. Where further structural support is required a back eight-way bracket 300 is used to sandwich the plurality of rails 288. The back eight-way bracket 300 is identical in construction and functionality and has all of the attributes of the custom reinforcement eight-way bracket 270 described above including having guide tabs, triangular locking dimples, and screw through holes.

Custom Reinforcement Five-Point Bracket

Figure 8A:
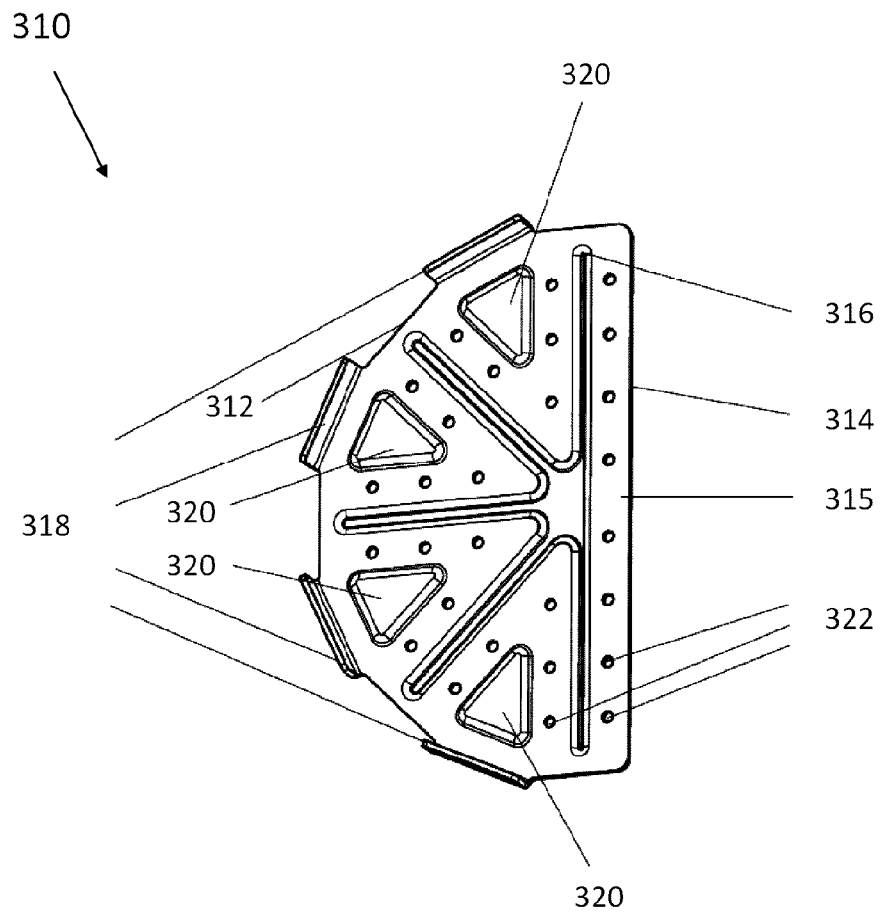
FIG. 8A, in a perspective top view, there is illustrated, a custom reinforcement five-point bracket of an embodiment of the present invention.
Figure 8B:
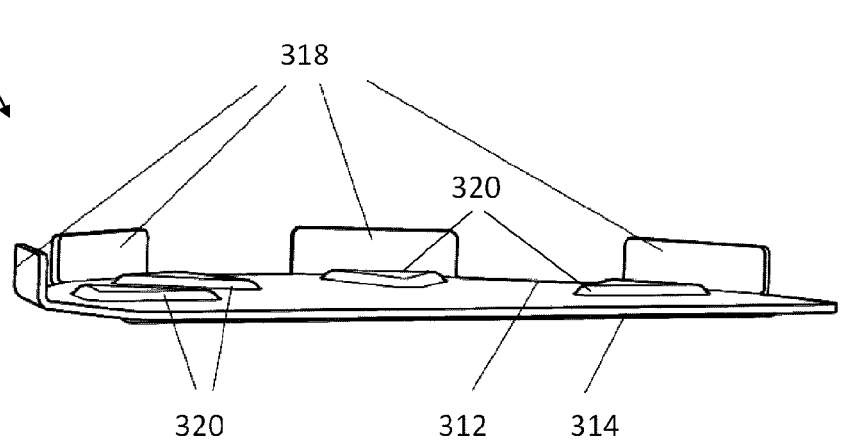
FIG. 8B, in a perspective side view, there is illustrated, the custom reinforcement five-point bracket of FIG. 8A.

Referring to FIG. 8A, in a perspective top view, and to FIG. 8B, in a perspective side view, there is illustrated, a custom reinforcement five-point bracket 310 of an embodiment of the present invention. The custom reinforcement five-point bracket 310 may be viewed as one-half of the custom reinforcement eight-way bracket 270 described above in detail.

The custom reinforcement five-point bracket 310 is a substantially planar half-disc having a semi-circle edge 312 and a linear edge 314, said linear edge 314 having a mid-point 315. At least four equally spaced apart five-point guide tabs 318, said five-point guide tabs 318 spaced apart around the semi-circle edge 312, are provided. Each of the plurality of five-point guide tabs 318, projects upward at a right angle to the main plane of the five-point bracket 310. At least four raised triangles 320 having one apex directed towards the midpoint 315 of the linear edge 314 are provided, one each of the at least four five-point guide tabs 318 being in line with one each of the at least four five-point guide tabs 318 and the mid-point 315 of the linear edge 314.

For increased structural strength, a five-point flute 316, having at least five rays, projecting outwards from the midpoint 315 and extending out between each of the at least four guide tabs 318 and further extending in both ways from the mid-point 315 along the linear edge 314 is provided. A plurality of fastener through holes 322 are provided spaced apart around each of the raised triangles 320 and along the linear edge 314.

The custom reinforcement five-point bracket is designed and configured to securely bind together a plurality of rails (not shown), said plurality of rails extending outwards from the mid-point 315 of the linear edge 314 of the five-point bracket 310. Preferably, the rails are of the design and configuration of one of the plurality of frame members 101 of the present invention.

In a preferred embodiment of the invention the custom reinforcement five-point bracket 310 is fabricated by injection molding to a thickness of $\frac{1}{16}$" and is substantially planar.

Custom Reinforcement Cross-Bracket

Figure 9A:
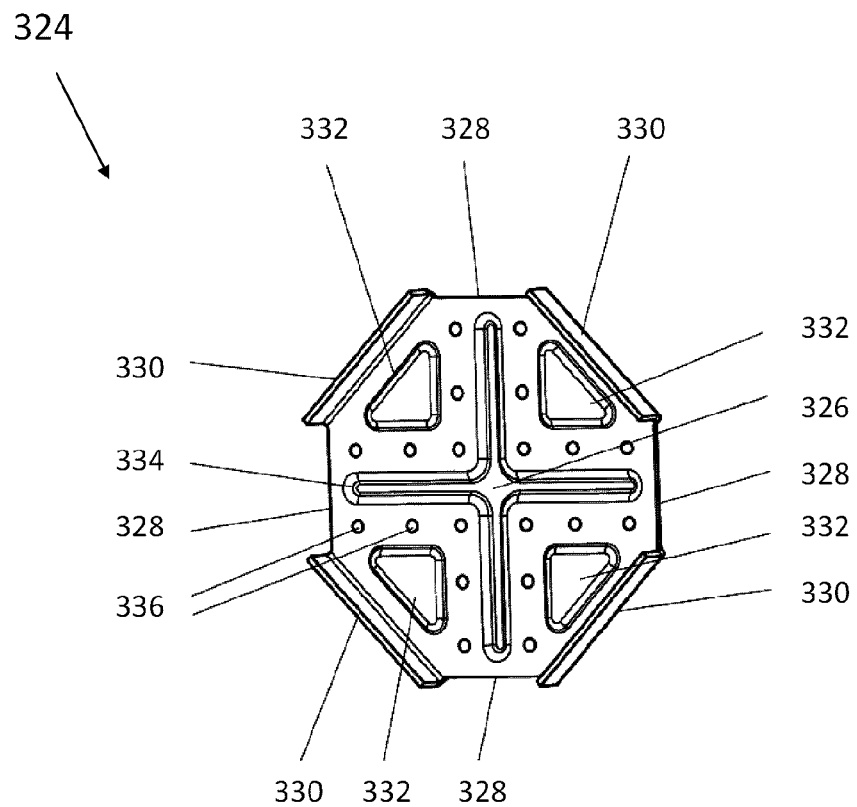
FIG. 9A, in a perspective top view, there is illustrated, a custom reinforcement cross bracket of an embodiment of the present invention FIG. 9B, in a perspective side view, there is illustrated, the custom reinforcement cross bracket of FIG. 9A.
Figure 9B:
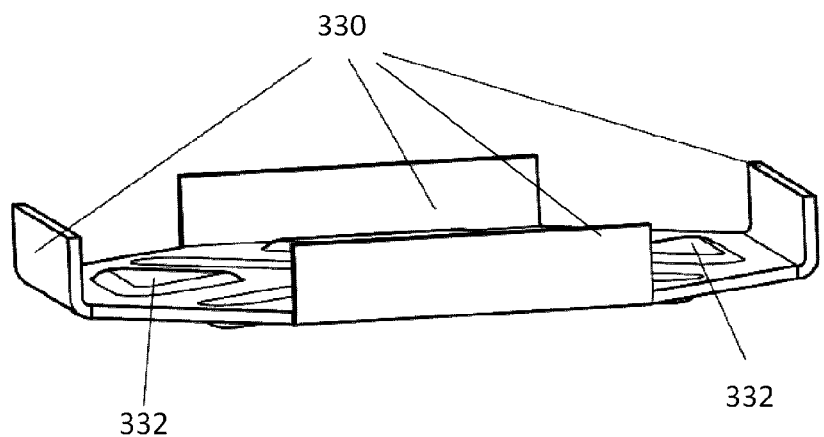

Referring to FIG. 9A, in a perspective top view, and to FIG. 9B, in a perspective side view, there is illustrated, the custom reinforcement cross bracket 324 of an embodiment of the present invention. The custom reinforcement cross bracket 324 may be viewed as comprising the merger of two of the custom reinforcement t-bracket 220, described in detail above, such that input rails (not shown) may be placed and secured in a cross-shaped pattern. The rails may be standard hollow rectangular pipes or tubes as available in the industry. Preferably, the rails are of the design and configuration of one of the plurality of frame members 101 of the present invention.

The custom reinforcement cross bracket 324 is substantially planar having a cross centre 326, and four mutually perpendicular arms 328 extending outwards from the cross centre 326.

Four rail guides 330, each projecting upward at a right angle to the plane of the cross-bracket 324, are provided. The four rail guides 330 are spaced radially away from the cross centre 326, each one of the four guide rails 330 are oriented perpendicularly to one each of the internal angle bisectors of the four arms 328 of the cross bracket 324.

The cross bracket 324 is further provided with a set of four spaced apart raised triangular locks 332. Each one of the set of four raised triangular locks 332 being in line with the cross centre 326 and one each of the four rail guides 330. Each one of the set of four raised triangular locks 332 has one apex pointed towards the cross centre 326 of the cross bracket 324.

For increased structural strength, the cross bracket 324 is provided with at least one cross-shaped flute 334 extending outwards from the cross centre 326 and running along each one of the four mutually perpendicular arms 328.

A plurality of screw through-hole sites 336 are positioned along the four mutually perpendicular arms 328 and are provided for receiving a screw (not shown) for securing the custom reinforcement cross bracket 324 to the chosen rails.

Example Structure

The structural capacity of the fully constructed final structure can be increased by securing together multiple snap-in framing members to act as a single but larger structural framing member by use of the snap-in and slide-in connection components of the present invention and discussed above. The snap-in framing members are further stabilized by using the custom reinforcement brackets of the present invention.

The easy quick connect structural system is a very versatile structural framing system which is useful for framing design projects quickly and efficiently. The main advantage to the design of the easy quick connect structural system is that it facilitates quick setup for any structural framing requirement size with simple future expandability opportunities.

The base model frame structure is a special frame with a unique size of 12' wide×20' length×8' height dimensions that is new to the portable or prefabricated housing market place. Embodiments of the invention include a rigid option and a folding option.

Figure 10:
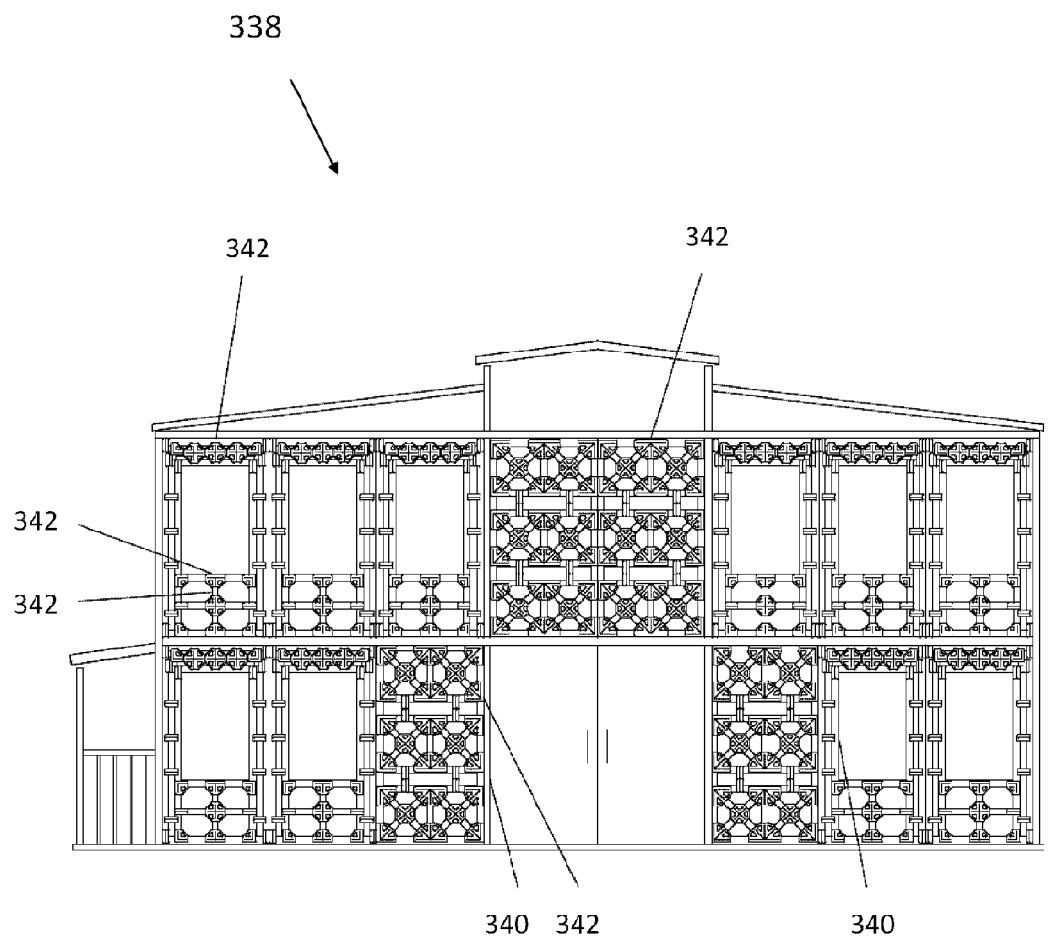
FIG. 10, in a front elevation view, there is illustrated a super structure of an embodiment of the present invention.

Referring to FIG. 10, in a front elevation view, there is illustrated a super structure 338 comprising many of the elements of the present invention including frame members 340, and custom reinforcement brackets 342.

Accessory Mounting

The main channels, stub-nosed channels and the claw assemblies provided in each of the plurality of frame members provide convenient sites for accepting, mounting and securing further components.

Figure 11:
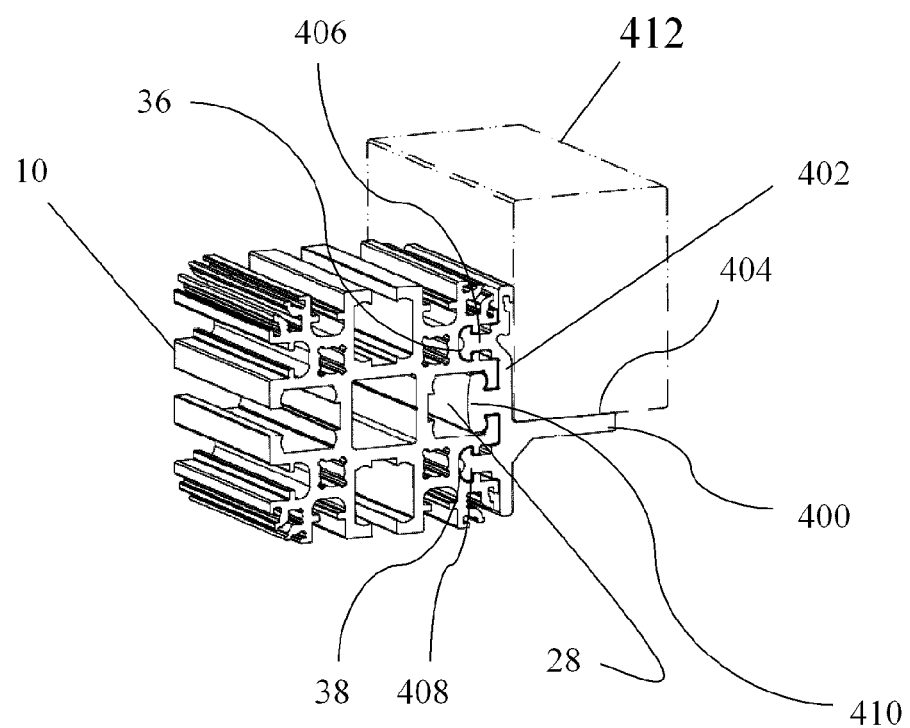
FIG. 11, in an end and side perspective view, there is illustrated a ledge insert inserted into the sample frame member 10 of FIG. 2B.

For example, referring to FIG. 11, in an end and side perspective view, there is illustrated a ledge insert 400 inserted into the sample frame member 10 of FIG. 2B of an embodiment of the present invention. The ledge insert 400 has a vertical backbone 402 and a horizontal ledge 404 affixed thereto and projecting horizontally away therefrom. Opposed to the horizontal ledge 404, the ledge insert 400 is provided with an upper stub-nosed mate 406 and a lower stub-nosed mate 408 affixed to the vertical backbone 402. The upper stub-nosed mate 406 and the lower stub-nosed mate 408 are spaced apart for insertion into the stub-nose channels 36 and 38 of the sample frame member 10. Intermediate between the upper stub-nosed mate 406 and the lower stub-nosed mate 408 an outer main channel insertion probe 410 projects outwards from the vertical backbone 402. The outer main channel insertion probe 410 is designed and configured for insertion into the outer main channel 28 of the sample frame member 10. In practice, the upper stub-nosed mate 406 and lower sub-nosed mate 408 are slidingly inserted into the stub-nosed channels 36 and 38 of the sample frame member 10 and, simultaneously, the outer main channel insertion probe 410 is slidingly inserted into the outer main channel 28 of the sample frame member 10. The horizontal ledge 404 may be used to support a box 412, for example, and other horizontal connection components such as flooring, decking, and joists.

Figure 12A:
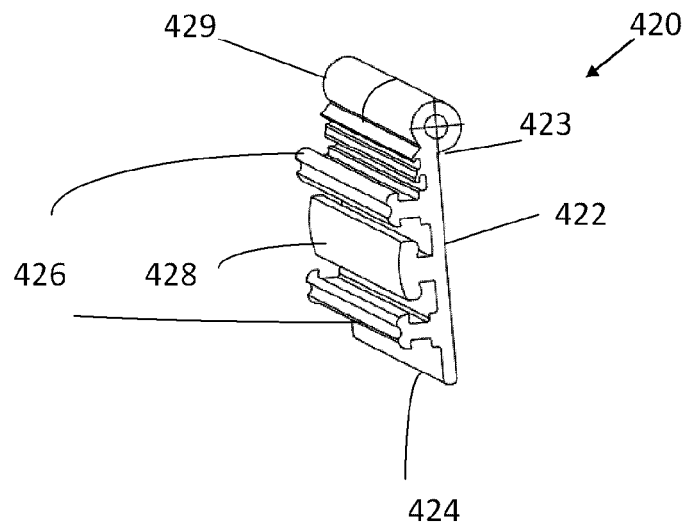
FIG. 12A, in an end and side perspective view, there is illustrated a hinge flap of an embodiment of the present invention.

This mounting means may be used to support other components. Referring to FIG. 12A, in an end and side perspective view, there is illustrated a hinge flap 420, The hinge flap 420 comprises a planar rectangular flap face 422, having a top edge 423, and a mounting surface 424 opposed to the planar flap face 422. A pair of spaced apart stub-nosed mates 426 and a central outer main channel mate 428 located between the pair of stub-nosed mates 426 project outwards from the mounting surface 424. The hinge flap 420 is further provided with a pin cylinder 429 running axially half-way along the top edge 423 of the planar rectangular flap face 422.

Figure 12B:
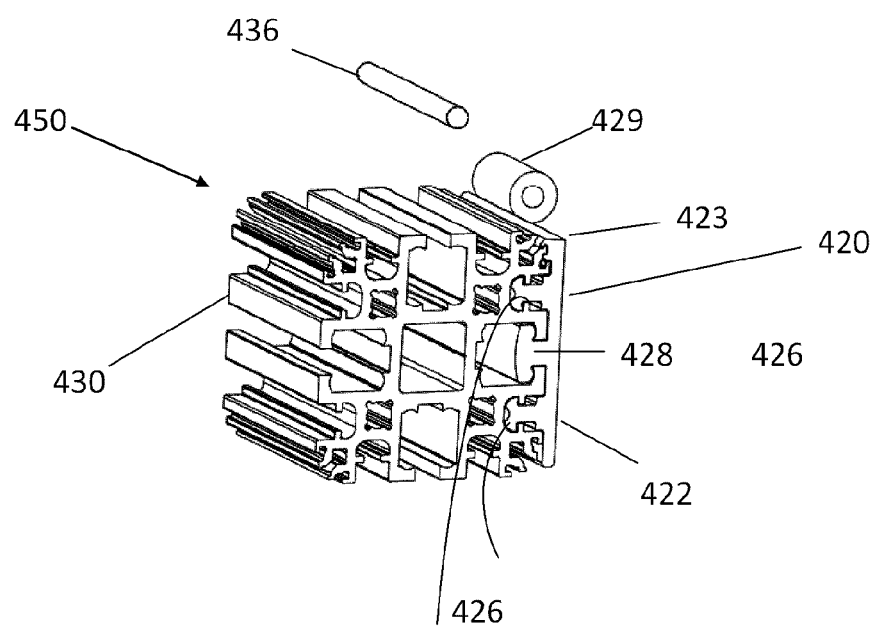
FIG. 12B, in an end and side perspective view, there is illustrated the hinge flap of FIG. 12A mounted into a first frame member of an embodiment of the present invention to form a left hinge element.

Referring to FIG. 12B, in an end and side perspective view, there is illustrated the hinge flap 420 of FIG. 12A mounted into a first frame member 430 to form a left hinge element 450. The first frame member 430 is selected from the plurality of frame members 101 and has all the attributes thereof. The pair of stub-nosed mates 426 of the hinge flap 420 are slidingly inserted into the pair of stub-nosed channels that run axially along one outer wall of the first frame member 430 and, simultaneously, the central outer main channel mate 428 is slidingly inserted into a main channel of the first frame member 430, said main channel running axially along the outer wall of the first frame member 430 and located midway between the pair of stub-nosed channels of the outer wall of the first frame member 430.

Figure 12C:
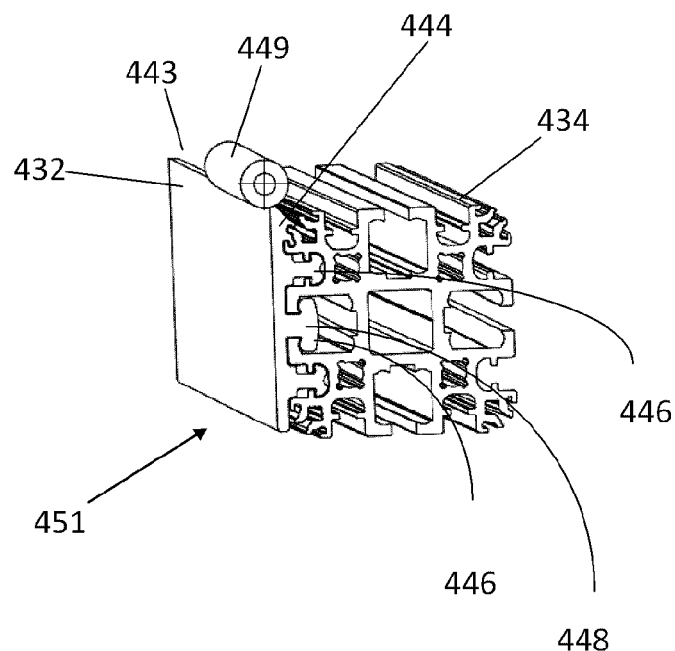
FIG. 12C, in an end and side perspective view, there is illustrated a second hinge flap of mounted into a second frame member of an embodiment of the present invention to form a right hinge element.
Figure 12:
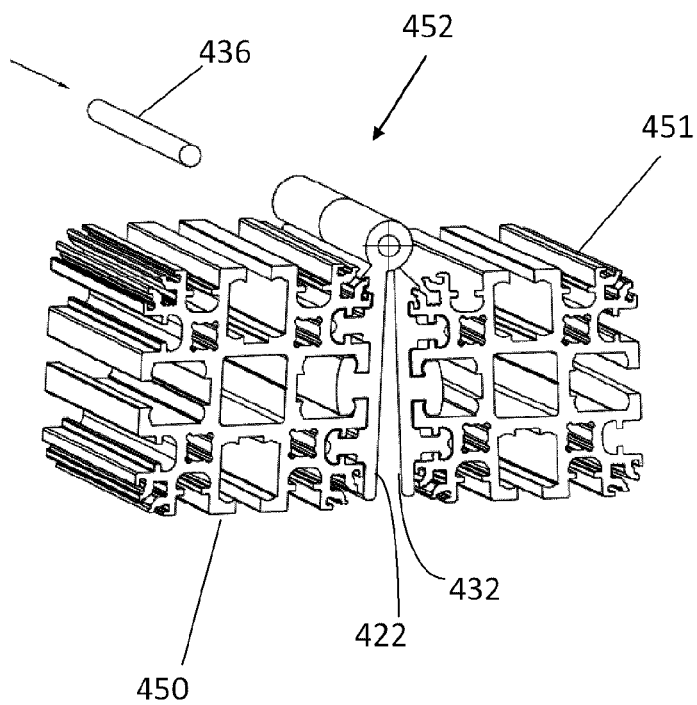
FIG. 12D, in an end and side perspective view, there is illustrated a hinge assembly comprising the left hinge element of FIG. 12B set side-by-side to the right hinge element of FIG. 12C.

Referring to FIG. 12C, in an end and side perspective view, there is illustrated a second hinge flap 432 mounted into a second frame member 434 to form a right hinge element 451. The second hinge flap 432 is identical in construction to the first hinge flap 420 and the second frame member 434 is identical in construction to the first frame member 430.

The second hinge flap 432 has a second planar flap face 442, having a second top edge 443, and a second opposed mounting surface 444. The second mounting surface is further provided with a second pair of spaced apart stub-nosed mates 446 and a second central outer main channel mate 448. The second hinge flap 432 is further provided with a second pin cylinder 449 running axially half-way along the second top edge 443 of the second planar flap face 442.

The second pair of stub-nosed mates 446 is slidingly inserted into a pair of stub-nosed channels of the second frame member 434 and, simultaneously, the second central outer main channel mate 448 is slidingly inserted into an outer main channel of the second frame member 434, said outer main channel running axially along the second frame member 434 between the pair of stub-nosed channels of the second frame member 434.

Referring to FIG. 12D, in an end and side perspective view, there is illustrated a hinge assembly 452 comprising the left hinge element 450 of FIG. 12B set side-by-side to the right hinge element 451 of FIG. 12C. In operation, the second frame member 434 is oriented parallel to the first frame member 430, such that the planar flap face 422 of the first hinge flap 420 sandwiches against the second planar flap face 442 of the second hinge flap 432. A pin 436 is slidingly inserted into the pin cylinder 429 and through the second pin cylinder 449 such that the hinge flap 420 and the second hinge flap 432 together can act as a hinge.

Other variations and modifications of the invention are possible and aspects of some of these have been described above. For example, the base model frame structure is designed to be a basic construction unit cell or a building block. Each base model frame structure can be joined to another base model frame structure on any of the side elevations (including the top and bottom) in order to increase the square footage for useable and enclosed area. A structure folding option can be built-in to the basic model by using snap-in or slide in connection components that have been designed and constructed as a hinge. The central hollow longitudinal chamber may be caste as a longitudinal cylinder. The ledge insert may be adapted to support vertical connection structures such as vertical walls, connection support accessories for wall panels and even providing vertical wall air gaps/spacing. All such modifications or variations and others that will occur to those skilled in the design of such systems are considered to be within the sphere and scope of the invention as defined by the claims appended hereto.

The embodiments of the invention in which an exclusive property or privilege is claimed are defined as follows:

1. A kit for a quick connect structural system for constructing framework structures comprising:
   a) a plurality of elongate rectangular prism frame members, each one of the plurality of frame members having a first end and a second end longitudinally opposed thereto, four external walls and four corners, each one of the plurality of frame members further comprising:
      i) a corner groove situated at each corner, said corner groove running axially along each one of the frame members and spanning the length thereof;
      ii) a central hollow longitudinal chamber, having four surrounding internal walls, said central chamber spanning the length of each one of the frame members from the first end to the second end;
      iii) at least one hollow longitudinal off-center chamber off-center of the central chamber, said off-center chamber spanning the length of each one of the plurality of frame members from the first end to the second end;
      iv) at least one outer main channel positioned in the center of any one of the external walls of each one of the plurality of frame members, said outer main channel spanning the length of the frame member from the first end to the second end;
      v) a pair of stub-nosed channels flanking each at least one outer main channel, said pair of stub-nosed channels spanning the length of the frame member from the first end to the second end;
      vi) a pair of opposed claw assemblies flanking each corner groove, said pair of opposed claw assemblies spanning the length of the frame member from the first end to the second end;

wherein
each one of the pair of claw assemblies comprises a finger-grip and an opposed thumb-lock;
  b) a plurality of snap-in perpendicular connectors each one of the plurality of snap-in perpendicular connectors having a first perpendicular connector end and an opposed anchor end, said anchor end configured to snap-in, mate, and brace against a wall panel, the first perpendicular connector end comprising a knife-edge probe and an adjacent spaced apart toe-hold and wherein the toe hold is configured to slide-in and mate with the thumb-lock grip of a selected one of the plurality of frame members and the knife-edge probe is configured for insertion into the corner groove of the selected one of the plurality of frame members;
  c) a plurality of reinforcement brackets configured to securely bind together a selection of the plurality of the frame members said reinforcement brackets comprising:
    i) a planar base plate;
    ii) a plurality of guide tabs spaced apart for receiving and guiding the selection of the plurality of frame members, said plurality of guide tabs projecting upwards from the base plate;
    iii) a plurality of raised dimples spaced apart on the base plate, said raised dimples for receiving and securing the selection of the plurality of frame members;
    iv) at least one flute spanning the base plate, said at least one flute for structural strength of the base plate.

2. The kit of claim 1 wherein the plurality of reinforcement brackets comprises a plurality of reinforcement corner brackets.

3. The kit of claim 1 wherein the plurality of reinforcement brackets comprises a plurality of reinforcement t-brackets.

4. The kit of claim 1 where in the plurality of reinforcement brackets comprises a plurality of reinforcement three-way brackets.

5. The kit of claim 1 wherein the plurality of reinforcement brackets comprises a plurality of reinforcement eight-way brackets.

6. The kit of claim 1 wherein the plurality of reinforcement brackets comprises a plurality of reinforcement five-point brackets.

7. The kit of claim 1 wherein the plurality of reinforcement brackets comprises a plurality of reinforcement cross brackets.

8. The kit of claim 1 further comprising at least one ledge insert said ledge insert comprising a vertical backbone and a horizontal ledge affixed thereto and projecting horizontally away therefrom; an upper stub-nosed mate and a lower stub-nosed mate affixed to the vertical backbone wherein the upper stub-nosed mate and the lower stub-nosed mate are configured for insertion into the pair of stub-nose channels of one of the plurality of elongate rectangular prism frame members; an outer main channel insertion probe projecting outwards from the vertical backbone, said outer main channel insertion probe configured for insertion into the at least one outer main channel of the one of the plurality of elongate rectangular prism frame members.

9. The kit of claim 1 further comprising at least one ledge insert said ledge insert comprising a vertical backbone and a vertical ledge affixed thereto and projecting vertically away therefrom; an upper stub-nosed mate and a lower stub-nosed mate affixed to the vertical backbone wherein the upper stub-nosed mate and the lower stub-nosed mate are configured for insertion into the pair of stub-nose channels of one of the plurality of elongate rectangular prism frame members; an outer main channel insertion probe projecting outwards from the vertical backbone, said outer main channel insertion probe configured for insertion into the at least one outer main channel of the one of the plurality of elongate rectangular prism frame members.

10. The kit of claim 1 further comprising at least one hinge flap, said hinge flap comprising a planar rectangular flap face, having a top edge, and a mounting surface opposed to the planar flap face; a pair of spaced apart stub-nosed mates and a central outer main channel mate located between the pair of stub-nosed mates, said pair of spaced apart stub-nosed mates and said central outer main channel mate projecting outwards from the mounting surface; a pin cylinder running axially half-way along the top edge of the planar rectangular flap face.

* * * * *